United States Patent [19]
Oda et al.

[11] Patent Number: 5,804,523
[45] Date of Patent: Sep. 8, 1998

[54] SINTERED PRODUCT OF SILICON NITRIDE

[75] Inventors: Takehiro Oda; Koichi Tanaka; Tomohiro Iwaida; Sentaro Yamamoto; Shoji Kohsaka; Masahiro Sato; Hideki Uchimura; Kenichi Tajima, all of Kokubu, Japan

[73] Assignee: Kyocera Corporation, Kyoto, Japan

[21] Appl. No.: 853,410

[22] Filed: May 9, 1997

Related U.S. Application Data

[63] Continuation of Ser. No. 455,168, May 31, 1995, abandoned.

[30] Foreign Application Priority Data

May 31, 1994 [JP] Japan .................................. 6-118409
Dec. 27, 1994 [JP] Japan .................................. 6-324731

[51] Int. Cl.$^6$ .................................................. C04B 35/587
[52] U.S. Cl. ............................................................ 501/97.2
[58] Field of Search ............................................ 501/97.2

[56] References Cited

U.S. PATENT DOCUMENTS

| | | | |
|---|---|---|---|
| 4,795,724 | 1/1989 | Soma et al. | 501/97 |
| 5,114,889 | 5/1992 | Osamura et al. | 501/97 |
| 5,178,809 | 1/1993 | Takahashi et al. | 501/97 |
| 5,219,500 | 6/1993 | Yoshida et al. | 501/97 |
| 5,401,450 | 3/1995 | Mitomo et al. | 501/97 |
| 5,518,673 | 5/1996 | Yeckley | 501/97 |
| 5,618,768 | 4/1997 | Higuchi et al. | 501/97.2 |
| 5,668,069 | 9/1997 | Sato et al. | 501/97.2 |

*Primary Examiner*—Karl Group
*Attorney, Agent, or Firm*—Loeb & Loeb LLP

[57] ABSTRACT

A sintered product of silicon nitride containing not smaller than 70 mol % of a β-silicon nitride as well as an element of the Group 3a at least including Lu of periodic table and impurity oxygen, wherein when the content of the element of the Group 3a of periodic table and the content of the impurity oxygen are, respectively, expressed being reckoned as the amount of an oxide of the element of the Group 3a of periodic table ($RE_2O_3$) and as the amount of $SiO_2$ of impurity oxygen, their total amount is from 2 to 30 mol %, the molar ratio ($SiO_2/RE_2O_3$) of the amount of the element of the Group 3a of periodic table reckoned as the oxide ($RE_2O_3$) thereof to the amount of impurity oxygen reckoned as $SiO_2$ is from 1.6 to 10, and the intergranular phase of the sintered product chiefly comprises a crystal phase consisting of the element of the Group 3a of periodic table, silicon and oxygen and a process for producing the same. The sintered product has a large strength from room temperature through up to high temperatures and maintains excellent resistance against oxidation even at high temperatures, and exhibits excellent resistance against creeping and excellent breaking toughness.

5 Claims, 1 Drawing Sheet

SINTERED PRODUCT OF SILICON NITRIDE

This is a continuation of application Ser. No. 08/455,168 filed on May 31, 1995, now abandoned.

BACKGROUND OF THE INVENTION

1. Field of the Invention

The present invention relates to a sintered product of silicon nitride which exhibits excellent strength from room temperature through up to high temperatures and can be used as automotive parts such as piston pins, cylinders, valves, cams rollers, rocker arms, piston rings, etc. and as parts for gas turbine engines such as turbine rotors, turbine blades, nozzles, combustors, scrolls, nozzle supports, seal rings, spring rings, diffusers, ducts, etc., as well as to a process for producing the same.

2. Description of the Prior Art

Sintered products of silicon nitride exhibit excellent heat resistance, shock resistance while heated and resistance against oxidation, and attempts have heretofore been made to utilize them as engineering ceramics and, particularly, as ceramics for thermal engines such as turbo rotors. The sintered products of silicon nitride are usually obtained by adding a sintering assistant such as $Y_2O_3$, $Al_2O_3$ or MgO to silicon nitride, and exhibit high density and large strength. As the sintered products of silicon nitride are now being used under the conditions of ever high temperatures, it has been desired to further improve their strength and resistance against oxidation at high temperatures. To meet such requirements, efforts have been made such as studying sintering assistants and improving firing conditions.

From such a standpoint that a low-melting oxide such as $Al_2O_3$ that has heretofore been used as a sintering assistant deteriorates properties at high temperatures, there has now been proposed a sintered product of a simple ternary composition ($Si_3N_4$—$SiO_2$—$RE_2O_3$) comprising silicon nitride, an oxide of au element of the Group 3a of periodic table (hereinafter referred to as $RE_2O_3$) such as $Y_2O_3$, and silicon oxide.

It has further been proposed to crystallize the intergranular phase in order to increase the strength of a sintered product at high temperatures. As crystal phases that precipitate, there have been known $Si_3N_4$—$SiO_2$—$RE_2O_3$ crystals such as YAM, apatite and wollastonite, $Si_3N_4$—$RE_2O_3$ crystals such as melilite, $SiO_2$—$RE_2O_3$ crystals such as disilicate, and $Si_3N_4$—$SiO_2$ crystals such as silicon oxynitride.

For instance, Japanese Laid-Open Patent Publication No. 100067/1988 proposes a sintered product of silicon nitride which contains two or more rare earth elements selected from Y, Er, Tm Yb and Lu, and in which a crystal phase of apatite structure is formed on the grain boundaries.

When the intergranular phase is crystallized, the strength at high temperatures is improved to some extent compared with when the grain boundaries are amorphous. However, resistance against oxidation is not sufficient at high temperatures, and stable crystal phase having excellent mechanical properties is not formed, making it difficult to put the sintered product into practical use. Accordingly, further improvements have been desired in regard to strength and resistance against oxidation.

When conventional sintered products containing a variety of rare earth elements are used as parts for gas turbines and as automotive parts, there takes place a so-called creeping in which the wintered products gradually undergo deformation when they bear large load under high-temperature conditions for extended periods of time.

Such a creeping deformation is a serious factor that hampers the sintered product from being practically used though it exhibits a large strength at first.

In the conventional sintered products of silicon nitride, there exists a conflicting relationship between the strength at high temperatures and the resistance against oxidation at high temperatures. In the sintered product of the above-mentioned Japanese Laid-Open Patent Publication No. 100067/1988, the apatite phase is precipitated by more than 50% to improve the strength at high temperatures resulting, however, in a decrease in the resistance against oxidation.

In order to improve the resistance against oxidation, there has been proposed a sintered product of silicon nitride in which silicon oxynitride is precipitated as a crystal phase on the grain boundaries Though the resistance against oxidation can be improved by precipitating the crystal phase, there arouses another problem in that the strength decreases at high temperatures.

Besides, the sintered product precipitating much silicon oxynitride has a decreased breaking toughness, permits silicon oxynitride to be decomposed over a depth of several millimeters from the surface of the sintered product during the firing, causes the surface to be coarsened and gives rise to the occurrence of irregular color tone.

SUMMARY OF THE INVENTION

The object of the present invention, therefore, is to provide a sintered product of silicon nitride having excellent resistance against oxidation at high temperatures and a sufficient degree of strength over a temperature range of from room temperature through up to 1500° C., and a process for producing the same.

Another object of the present invention is to provide a sintered product of silicon nitride which has excellent resistance against creeping even when it is used at temperatures of higher than 1500° C. for extended periods of time, has high breaking toughness, and does not develop decomposed phase over the surface of the wintered product, in addition to exhibiting the above-mentioned properties.

According to the present invention, there is provided a sintered product of silicon nitride containing not smaller than 70 mol % of a β-silicon nitride as well as an element of the Group 3a at least including Lu of periodic table and impurity oxygen, wherein when the content of the element of the Group 3a of periodic table and the content of the impurity oxygen are, respectively, expressed being reckoned as the amount of an oxide of the element of the Group 3a of periodic table ($RE_2O_3$) and as the amount Of $SiO_2$ of impurity oxygen, their total amount is from 2 to 30 mol %, the molar ratio ($SiO_2/RE_2O_3$) of the amount of the element of the Group 3a of periodic table reckoned as the oxide ($RE_2O_3$) thereof to the amount of impurity oxygen reckoned as $SiO_2$ is from 1.6 to 10, and the intergranular phase of the sintered product chiefly comprises a crystal phase consisting of the element of the Group 3a of periodic table, silicon and oxygen.

According to an embodiment of the present invention, furthermore, there is provided a sintered product of silicon nitride wherein the β-silicon nitride is contained in an amount of from 70 to 97 mol %, the oxide of the element of the Group 3a of periodic table ($RE_2O_3$) and $SiO_2$ of impurity oxygen are contained in a total amount of from 3 to 30 mol %, the molar ratio ($SiO_2/RE_2O_3$) is from 1.6 to 3.8, the β-silicon nitride exists in the form of crystalline particles having an average particle size of not larger than 5 μm, the intergranular phase of the crystalline particles comprises at least one of a disilicate crystal phase and a monosilicate crystal phase, and there exists no crystal phase that contains nitrogen atoms.

According to the present invention, there are further provided a process for producing a sintered product of silicon nitride comprising:

a stop for molding a mixture powder of 70 to 97 mol % of a powder of silicon nitride which contains not smaller than 90% of an α-silicon nitride and a total amount of 3 to 30 mol % of a silicon oxide and an oxide of an element of the Group 3a at least including Lu, the ratio of the amount of the oxide of an element of the Group 3a of periodic table to the amount of the silicon oxide being from 1.6 to 3.8;

a step for firing the obtained molded body at a temperature of from 1500° to 2000° C. in nitrogen atomosphere to obtain a sintered product in which at least one of disilicate phase or monosilicate phase is chiefly precipitated on the intergranular crystal phase, and a process for producing a sintered product of silicon nitride comprising:

a step for molding a mixture powder of 70 to 97 mol % of silicon or a silicon nitride and silicon reckoned as nitride and a total amount of 3 to 30 mol % of a silicon oxide and an oxide of an element of the Group 3a of periodic table, the molar ratio of the amount of the oxide of an element of the Group 3a at least including Lu of periodic table to the amount of the silicon oxide being from 1.6 to 3.8;

a step for heat-treating said molded article in a nitrogen-containing atmosphere at a temperature of from 800° to 1500° C. in nitrogen atomosphere to nitrogenate said silicon;

a step for firing said nitride at a temperature of from 1500° to 2000° C. in nitrogen atomosphere to obtain a sintered product in which at least one of disilicate phase or monosilicate phase is precipitated on the intergranular crystal phase.

DETAILED DESCRIPTION OF THE PREFERRED EMBODIMENT

Figure 1:
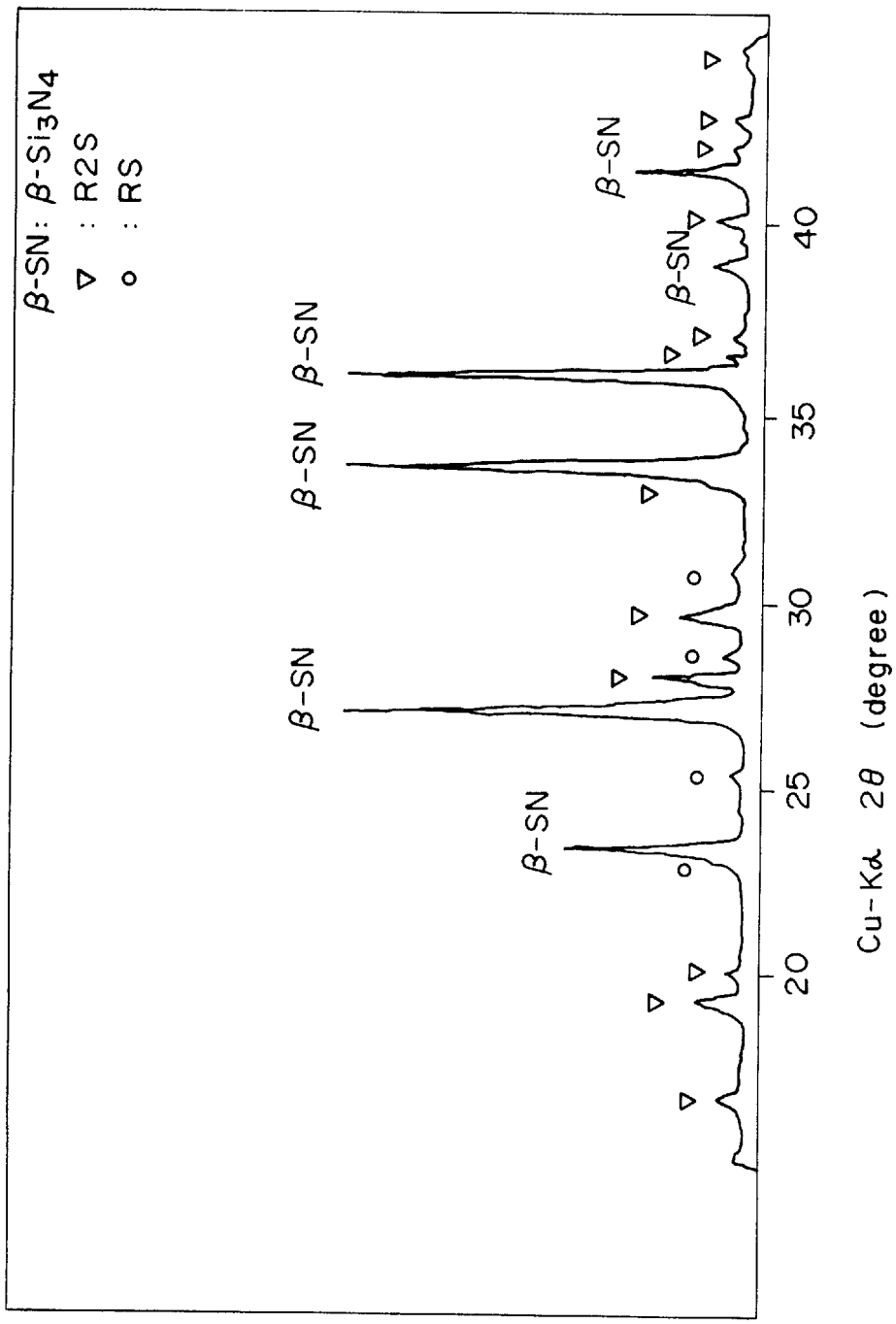
FIG. 1 is a chart of X-ray diffraction measurement of a sintered product of silicon nitride according to an embodiment of the present invention.

A sintered product of silicon nitride of the present invention comprises chiefly a silicon nitride and further contains an element of the Group 3a at least including Lu of periodic table and impurity oxygen.

Here, the impurity oxygen stands for the amount of oxygen that remains when the amount of oxygen attributable to the added components except silicon oxide is subtracted from the total amount of oxygen in the sintered product. It is considered that in most cases, the impurity oxygen is due to oxygen contained in the starting silicon nitride, due to silicon oxide that is added or, depending upon the cases, due to oxygen adsorbed in the step of production. The impurity oxygen forms, for example, $SiO_2$ that includes a chemical bond Si—O.

Described below is a sintered product of the first embodiment among the sintered products of silicon nitride of the present invention.

According to this embodiment of the present invention, the sintered product comprises a silicon nitride crystal phase as a main phase which is chiefly a $β-Si_3N_4$ having an average particle size of from 1 to 30 μm. Furthermore, a distinguished feature resides in that crystals of at least an element of the Group 3a of periodic table at least including Lu, Si (silicon) and O (oxygen) (hereinafter often referred to as RE—Si—O crystals) exist on the grain boundaries of the main phase. Here, the RE—Si—O crystals stand for a disilicate phase represented by $RE_2Si_2O_7$ or a monosilicate phase represented by $RE_2SiO_5$. In the sintered product of this embodiment, a nitrogen-containing oxynitride glass may exist on the intergranular phase in addition to the above-mentioned crystal phase when the crystallization is not sufficient. The glass phase may deteriorate the mechanical properties to some extent at high temperature but little affects the resistance against oxidation and breaking toughness. Therefore, there arises no particular problem provided its formation is in such a level that the above-mentioned crystal phase is obviously detected by the x-ray diffraction.

According to the embodiment of the present invention, it is desired that the sintered product contains the silicon nitride in an amount of not smaller than 70 mol % and, particularly, from 85 to 99 mol %, contains an element of the Group 3a of periodic table in an amount of from 1 to 10 mol % and, particularly, from 1 to 7 mol % reckoned as an oxide, and contains impurity oxygen in an amount of from 1 to 15 mol % and, particularly, from 1 to 12 mol % reckoned as $SiO_2$. The composition is limited as described above. This is because, when the amount of the silicon nitride is smaller than 70 mol %, a large strength is not obtained at high temperatures and when the amount of the element of the group 3A of periodic table is not larger than 1 mol %, the sintered product fails to acquire density to a sufficient degree. When the amount of the element of the Group 3a of periodic table exceeds 10 mol %, on the other hand, the strength and the resistance against creeping are deteriorated at high temperatures. When the amount of impurity oxygen is smaller than 1 mol %, furthermore, compounds of silicon nitride and oxides of elements of the Group 3a of periodic table, such as melilite and the like having small resistance against oxidation at high temperatures, are formed on the grain boundaries, which is not desirable. When the amount of impurity oxygen exceeds 15 mol %, on the other hand, the volume percentage of the intergranular phase increases to impair properties at high temperatures.

The sintered product of the present invention has a great feature in that it contains at least Lu (lutetium) as an element of the Group 3a of periodic table. It is desired that lutetium is contained in an mount of not smaller than 0.5 mol %, especially not smaller than 1 mol % reckoned as an oxide thereof in the whole sintered product. The sintered product of the present invention may further contain Y, Yb, Er, Dy, Ho, Tb, Sc and Tm, in addition to Lu, as elements of the Group 3a of periodic table. It is desired that Lu is contained in an amount of not smaller than 50 atm %, particularly, not smaller than 60 atm %, and more particularly, not smaller than 80 atm % in the whole elements of the group 3a of periodic table.

According to the present invention, furthermore, it is desired that the molar ratio ($SiO_2/RE_2O_3$) of the element of the Group 3a of periodic table reckoned as an oxide thereof ($RE_2O_3$) to the amount of impurity oxygen reckoned as $SiO_2$ is from 1.6 to 3.5 and, particularly, from 1.6 to 2.7. This is because, when the above-mentioned molar ratio is below 1.6, precipitation of the phase $RE_2Si_2O_7$ or the phase $RE_2SiO_5$ cannot be expected. When the molar ratio is above 3.5, on the other hand, the phase $Si_2N_2O$ is precipitated in such an increased amount that a decomposition layer is formed on the surface to deteriorate properties.

The crystals of phase $Si_2N_2O$ has properties similar to those of the crystals $Si_3N_4$. However, an increase in its amount impairs the $Si_3N_4$ crystals from acquiring needle-like shape and causes the breaking toughness to decrease. Moreover, when the partial pressure of SiO gas is low during the firing in a non-oxidizing atmosphere, the $Si_2N_2O$ crystals tend to be decomposed on the outer surface of the sintered product; i.e., decomposed phase is formed over a thickness of about several millimeters from the surface giving rise to the occurrence of irregular color tone. Therefore, the partial pressure of SiO gas is increased to suppress the $Si_2N_2O$ crystals from decomposing and to eliminate irregularity in the color tone.

In addition to the above-mentioned composition, the sintered product of the present invention may further contain, based upon known technology, metals of the Groups 4a, 5a and 6a of periodic table and carbides, nitrides and silicates thereof such as TiN, TiC, TaC, TaN, VC, NbC, WC, $WSi_2$, $Mo_2C$, etc. or SiC that do not deteriorate properties of the sintered product in the form of dispersed particles or whiskers as independent phases in suitable amounts to serve as composite materials in order to improve properties of the sintered product of the invention.

However, metals such as Al, Mg, Ca and Fe form low-melting oxides to impair crystallization of intergranular phase and to deteriorate strength at high temperatures. Therefore, the amount of their addition should be limited to be not larger than 1% by weight, particularly, not larger than 0.5% by weight, and more particularly, not larger than 0.1% by weight in total amount reckoned as oxides thereof.

Described below is a process for producing the sintered product of silicon nitride according to the embodiment of the present invention. A powder of silicon nitride is used as a chief starting material, and a powder of oxide of an element of the Group 3a of periodic table including at least $Lu_3O_3$ is used as an additive or, depending upon the cases, a powder of silicon oxide is added. Specifically, powders Of $Lu_2O_3$ and SiO, or powders of silicon nitride, $Lu_2O_3$ and $SiO_2$ can be used as additives. The powder of the silicon nitride that is used may be either of the α-type or the β-type. Desirably, the particle size is from 0.4 to 1.2 μm, the amount of cationic impurities is not larger than 1% by weight and, particularly, not larger than 0.5% by weight, and the amount of impurity oxygen is from 0.5 to 2.0% by weight. The silicon nitride powder can be prepared by either the direct nitrogenation method or the imide decomposition method.

According to the present invention, these powders are so mixed together as to satisfy the aforementioned composition. In controlling the above-mentioned ratio $SiO_2/RE_2O_3$, the amount of oxides of the element of the Group 3a of periodic table such as $Lu_2O_3$ and the like is determined by taking into account the oxygen which is inevitably contained in the silicon nitride such as the one of $SiO_2$ or the one adsorbed in the step of production. Depending upon the cases, the starting powders may be mixed together inclusive of the $SiO_2$ powder.

The powders are weighed at the above-mentioned ratio, mixed together to a sufficient degree using vibration mill, rotary mill or barrel mill. The mixture of powders is then molded into an article of any shape by any molding means such as metal mold press, cast molding, extrusion molding, injection molding, cold isostatic pressure press or the like.

The molded article is then fired by any widely known firing method such as hot press method, normal-pressure firing method, or nitrogen gas-pressure firing method to increase its density. The density can be further increased by effecting the hot hydrostatic pressure firing (HIP) after the above-mentioned firing. Furthermore, the molded article or the sintered product may be fired by the HIP method by being sealed with a glass. Concretely speaking, the molded article or the sintered product is fired at a temperature of from 1500° to 2000° C. under a nitrogen pressure in which the silicon nitride does not decompose. When the firing temperature exceeds 2000° C., the crystals of silicon nitride grow to deteriorate the strength. The sintered product is further gradually cooled after it is fired, or the sintered product is heat-treated at 1000° to 1700° C. to crystallize the grain boundaries, in order to further improve properties.

When a high dimensional precision is required, furthermore, the powder of silicon nitride is partly substituted by a Si powder to prepare a molded article which is then heat-treated at a temperature of from 800° to 1500° C. in a nitrogen-containing atmosphere to treat the Si powder with nitrogen to transform it into $Si3N_4$ in an attempt to increase the density of the molded article, followed by firing under the above-mentioned firing conditions to reduce the shrinking during the firing.

By selecting at least Lu as an element of the Group 3a of periodic table that constitutes the grain boundaries of the sintered product of silicon nitride, the sintered product of the embodiment exhibits improved properties at high temperatures compared with those of when other elements of the Group 3a of periodic table are used as in the prior art. The mechanism why such an excellent action is exhibited is attributed to that Lu has the smallest ion diameter in the lanthanoid, and produces a large bonding force with other elements exhibiting large mechanical strength at high temperatures and small slipping phenomenon on the grain boundaries which is a principal cause of creeping and, besides, permits oxygen to be diffused little, which accounts for an increase in the resistance against oxidation compared with when other elements of the Group 3a of periodic table are used.

Moreover, what determines the resistance against oxidation of the sintered product is the property on the grain boundaries of the intergranular phase of the sintered product. According to the present invention, at least the phases $RE_2Si_2O_7$ and $RE_2SiO_5$ are precipitated which remain very stable even in an oxidizing atmosphere heated at high temperatures, making it possible to exhibit excellent resistance against oxidation.

The $Si_2N_2O$ crystals may form a crystal phase that remains stable in an oxidizing atmosphere at high temperatures. However, an increase in the amount of the $Si_2N_2O$ crystals impairs the $Si_3N_4$ crystals from acquiring needle-like shapes and, hence, results in a decrease in the breaking toughness of the sintered product and, besides, permits the formation of a decomposed phase on the surface unless the $SiO_2$ gas atmosphere of high pressure is employed during the firing. On the other hand, the crystals of phases $RE_2Si_2O_7$ and $RE_2SiO_5$ do not impair the $Si_3N_4$ crystals from acquiring needle-like shapes, and are stably formed without affected by the atmosphere during the firing and, thus, make it possible to improve the breaking toughness yet maintaining large resistance against oxidation and to suppress the decomposition on the surface of the sintered product.

Among the sintered products of silicon nitride of the present invention, the sintered product of the second embodiment has a feature in that the crystals in the β-silicon nitride crystal phase which is a principal phase are constituted by fine crystalline particles having an average short-axis particle diameter of not larger than 5 μm and, particularly, from 1 to 3 μm. Another great feature is that an aspect ratio represented by long-axis diameter/short-axis diameter of crystalline particles has an average value which is as relatively small as from 5 to 15. Owing to such a small average diameter and a small aspect ratio of the crystalline particles, the sintered product exhibits an increased mechanical strength. In the sintered product of this embodiment, therefore, when the average short-axis diameter is not smaller than 5 μm, the silicon nitride crystalline particles themselves could become a cause of destruction resulting in a decrease in the mechanical strength. In particular, the aspect ratio affects the toughness. When the aspect ratio is not larger than 5 in average, the toughness is low and when the aspect ratio exceeds 15 in average, the strength tends to decrease. The silicon nitride mostly comprises $\beta$-$Si_3N_4$.

According to the present invention, the sintered product of silicon nitride has a further feature in that the intergranular phase of the silicon nitride crystal phase which is the chief phase is crystallized, the crystals thereof forming a disilicate phase represented by $RE_2Si_2O_7$ and/or a monosilicate phase represented by $RE_2SiO_5$, and preferably, there exists no other crystal phase containing nitrogen. This is because, the above-mentioned crystal phases exhibit excellent stability in an oxidizing atmosphere, but crystals that contain nitrogen such as YAM, apatite, wollastonite, melilite and silicon oxynitride, lack stability in an oxidizing atmosphere compared with the above-mentioned crystals. Therefore, existence of the nitrogen-containing crystal phase in the intergranular phase deteriorates the resistance against oxidation of the sintered product.

In the crystal phase containing nitrogen, it is preferred that a peak ascribable to crystals containing nitrogen is not detected at all, for example in an X-ray diffraction measurement using Cu—Kα rays, a maximum peak due to the above-mentioned disilicate phase or monosilicate phase does not go beyond a chart, namely in a usually used sensitivity.

According to the embodiment of the present invention, the sintered product contains the $\beta$-silicon nitride in an amount of from 70 to 97 mol % and, particularly, from 85 to 93 mol %, contains a total amount of from 3 to 30 mol % and, particularly, from 7 to 15 mol % of a compound of an element of the Group 3a of periodic table at least including Lu and impurity oxygen reckoned as an oxide of a compound of an element of the Group 3a of periodic table and as $SiO_2$ of impurity oxygen, has a molar ratio of the amount of the oxide of the compound of the element of Group 3a of periodic $RE_{23}$ to the amount of $SiO_2$ of impurity oxygen, i.e., has a molar ratio $SiO_2/RE_2O_3$ of from 1.6 to 3.8. The composition is limited as described above. This is because, when the amount of $\beta$-silicon nitride is smaller than 70 mol % or when the total amount of the compound of the element of the Group 3a of periodic table and the impurity oxygen exceeds 30 mol %, the strength is deteriorated at high temperatures. When the amount of $\beta$-silicon nitride exceeds 97 mol % or when the total amount of the compound of the element of the Group 3a of periodic table and the impurity oxygen becomes smaller than 3 mol %, the sintering is not effected to a sufficient degree and a densely sintered product is not obtained. When the molar ratio $SiO_2/RE_2O_3$ is smaller than 1.6, there is formed a crystal phase containing nitrogen as described above.

Examples of the element of the Group 3a of periodic table used in the present invention include Y, Yb, Er, Dy, Ho, Tb, Sc, Tm and Lu. Among them, the elements such as Er, Tm, Yb and Lu have smaller ion radii than those of Y, etc., and help increase the viscosity of the crystal phase formed in the grain boundaries and markedly enhance the strength of the sintered product. According to this invention, especially Lu (lutetium) has the smallest ionic radias, and it is important to include Lu as an essential element.

This Lu is desirably contained in an amount of at least 0.5 mol %, especially at least 1 mol % calculated as an oxide in the entire amount. It is also possible to use a combination of Lu and another element of Group 3a of the periodic table.

In addition to the above-mentioned composition, the sintered product of the present invention may further contain, based upon known technology, metals of the Groups 4a, 5a and 6a of periodic table and carbides, nitrides and silicates thereof such as TiN, TiC, TaC, TaN, VC, NbC, WC, $WSi_2$, $Mo_2C$, $MoSi_2$, etc. or SiC that do not deteriorate properties of the sintered product in the form of dispersed particles or whiskers as independent phases in suitable amounts to serve as composite materials in order to improve properties of the sintered product of the invention.

However, metals such as Al, Mg, Ca and Fe form low-melting oxides to impair crystallization of intergranular phase and to deteriorate strength at high temperatures. Therefore, the amount of their addition should be limited to be not larger than 1% by weight, particularly, not larger than 0.5% by weight, and more particularly, not larger than 0.1% by weight in total amount reckoned as oxides thereof.

Described below is how to produce the above-mentioned sintered product of silicon nitride of the present invention. As starting materials, first, there are prepared 70 to 97 mol % and, particularly, 85 to 93 mol % of a powder of silicon nitride containing not less than 90% of the α-silicon nitride, and a total of from 3 to 30 mol % and, particularly, from 7 to 15 mol % of an oxide of an element of the Group 3a of periodic table at least including Lu, and silicon oxide, the molar ratio $(SiO_2/RE_2O_3)$ of the amount of the oxide $(RE_2O_3)$ of the element of the Group 3a of periodic table to the amount of the silicon dioxide $(SiO_2)$ being from 1.6 to 3.8. Furthermore, as regards silicon oxide, silicone oxide is included assuming that impure oxygen contained in a silicon nitride powder exists as $SiO_2$.

In the embodiment of the invention, it is desired that the silicon nitride which is a starting material has an average particle diameter of from 0.4 to 1.2 μm, the cationic impurities are contained in amounts of not larger than 1% by weight and, particularly, not larger than 0.5% by weight, and the amount of impurity oxygen is from 0.5 to 2.0% by weight. Moreover, either the direct nitrogenation method or the divide decomposition method may be employed. Here, however, the α-amount in the silicon nitrogen powder is limited as described above because of the reason that when the amount of α-silicon nitride is smaller than 90%, the sintering property is impaired and it becomes difficult to control the crystalline particles in the step of sintering, making it difficult to form fine composition and resulting in a decrease in the strength. Furthermore, the amount of the silicon nitride, the amount of the oxide of the element of the Group 3a of periodic table and the amount of the silicon oxide are limited based upon the same reasons as limiting the composition of the sintered product.

The thus prepared mixture powder is kneaded and mixed to a sufficient degree, and is then molded into a desired shape by a widely known molding method such as press molding, cast molding, extrusion molding, injection molding, sludge molding, cold isostatic pressure molding or the like molding.

Next, the obtained molded article is fired relying upon a widely known firing method such as hot press method, normal-pressure firing, nitrogen gas-pressure firing, or the like in nitrogen atmosphere at a temperature of from 1500° to 2000° C. According to preferred embodiment of the present invention, at this moment, the molded article is, first, fired at a temperature of 1500° to 1700° C. to obtain a sintered product containing β-silicon nitride in an amount of not smaller than 70% and, particularly, not smaller than 80%, and in which the disilicate phase and/or the monosilicate phase are precipitated on the intergranular crystal phase. In the first firing step, the amount of β-silicon nitride is limited to lie within the above-mentioned range. This is because, when the amount of β-silicon nitride is smaller than 70%, the particles of silicon nitride grow vigorously in the subsequent step of sintering, whereby the crystals of silicon nitride become coarse to impair the density of silicon nitride in the first firing step, furthermore, it is desired to contain an SiO gas in the atmosphere to promote the precipitation of the disilicate phase and/or the monosilicate phase and to suppress the change in the composition caused by decomposition reaction or the like. The SiO gas can be produced by placing an $SiO_2$ powder or an $Si/SiO_2$ mixture powder in the furnace.

Following the above-mentioned first firing step, the sintered product is fired at a temperature in excess of 1700° C., desirably, at a temperature at which the sintered product is fired to acquire a dense composition and, concretely speaking, fired at a temperature of from 1800° to 2000° C.

The atmosphere in the above-mentioned firing step must contain nitrogen. As the firing temperature increases, however, the silicon nitride tends to be decomposed. Depending upon the temperature, therefore, it is desired to introduce a nitrogen gas maintaining a pressure higher than a decomposition equilibrium pressure of silicon nitride. Concretely speaking, it is desired that the first firing step is carried out under a pressure of 1 to 3 atms and the second firing step is carried out under a pressure of 5 to 100 atms, the pressure in the second firing step being higher than the pressure in the first firing step.

After the above-mentioned firing steps, the density of the sintered product can be further enhanced by effecting the hot hydrostatic pressure firing at 1500° to 1900° C. using an argon gas or a nitrogen gas of a pressure of 500 to 2000 atms.

According to the production process of the present invention, furthermore, when a product having a high dimensional precision is to be produced, the density of the molded article of before being fired must be heightened to suppress the shrinking during the firing. The density of the molded article can be enhanced by molding silicon or a mixture powder of silicon and silicon nitride which is a starting material into an article of a predetermined shape, and heat-treating it in a nitrogen atmosphere of an elevated pressure at a temperature of from 1150° to 1400° C. in order to nitrogenate silicon in the molded article, such that the volume expands.

The molded article of which the density is enhanced as described above is then subjected to the above-mentioned first firing step and the second firing step in order to obtain a sintered product of silicon nitride of the present invention having fine structure, large strength, excellent resistance against oxidation and high dimensional precision.

According to the embodiment of the present invention, the intergranular phase of silicon nitride crystalline particles is controlled so that crystal phase of disilicate phase and/or monosilicate phase is precipitated without, however, permitting the precipitation of the nitrogen-containing crystal phase, thus making it possible to obtain a sintered product having excellent resistance against oxidation at high temperatures. At the same time, the nitrogen-containing crystalline particles are transformed into those of the β-type so as to have fine particle diameters, to increase the strength at high temperatures.

In the process for producing the sintered product, the decomposition reaction takes place more vigorously than rendering the sintered product to become dense in a temperature region which is not higher than 1700° C. in the firing step. Therefore, the composition is subject to change resulting in the formation of a nitrogen-containing crystal phase having interior resistance against oxidation. The sintered product tends to become dense at a rapid rate through the firing at a temperature in excess of 1700° C. Accordingly, the nitrogen-containing crystal phase that is once formed in this step remains even in the finally obtained sintered product. According to the present invention, therefore, the disilicate phase and/or the monosilicate phase are precipitated while suppressing the decomposition reaction in a temperature region which is not higher than 1700° C., in order to suppress the formation of the nitrogen-containing crystals.

In the present invention, it is also necessary to so control that the silicon nitride contains the β-silicon nitride in an amount of not smaller than 70% at a temperature which is not higher than 1700° C. When the temperature in excess of 1700° C. is maintained in a state where the β-silicon nitride has not been sufficiently precipitated, the β-silicon nitride precipitates abruptly at a temperature in excess of 1700° C. The thus precipitated β-silicon nitride tends to acquire a coarse particular form which makes it difficult to obtain the sintered product in a dense form and gives rise to the formation of fine voids. Moreover, the crystals grow abnormally causing the strength to decrease.

By forming the β-silicon nitride to a sufficient degree at a temperature of not higher than 1700° C., therefore, the silicon nitride crystals are obtained in fine sizes making it possible to reduce the formation of voids, to suppress abnormal growth of particles, and, hence, to obtain a sintered product maintaining excellent strength from room temperature through up to high temperatures.

EXAMPLES

The invention will now be described more concretely by way of Examples.

(Example 1)

A powder of silicon nitride (BET specific surface area: 8 $m^2/g$, α-rate: 98%, amount of oxygen: 1.2% by weight amounts of metal impurities: 0.03% by weight), an $LU_2O_3$ powder, a powder of an oxide of an element of the Group 3a of periodic table other than $Lu_2O_3$ and a powder of a silicon oxide were used as starting materials, and were weighed and mixed together such that the compositions of the molded articles were as shown in Table 1. By using the $Lu_2O_3$ powder or an $RE_2Si_2O_7$ powder synthesized from the $Lu_2O_3$ powder, a powder of an oxide of an element of the Group 3a of periodic table and a silicon oxide powder (sample No. 1–9), furthermore, a composition was prepared as shown in Table 1. By adding a binder, the compositions were molded into articles using a metal mold under a pressure of 1 $ton/cm^2$.

The molded articles were heated at a predetermined temperature to remove the binder and were then fired.

To minimize changes in the compositions of the molded articles during the firing, the samples Nos. 1—1 to 1–14 were introduced into a pot of silicon carbide, and were fired in a nitrogen gas stream of a pressure of 10 atms at 1850° C. for 4 hours (GPS method). The obtained sintered products were then heat-treated in a nitrogen stream at 1400° C. for 24 hours, so that the intergranular phase was crystallized to a sufficient degree.

Furthermore, the molded articles of the samples Nos. 1–15 to 1–22 were sintered by the glass-sealed HIP method. Concretely speaking, a BN powder having poor wettability relative to a glass was applied in the form of a slurry to the molded articles or the slurry was sprayed onto the molded articles prior to effecting the firing in order to prevent the reaction, during the firing, with the glass which was a sealing material. Next, the molded articles coated with BN and the like were sealed in a glass capsule and were fired by the HIP method at 1700° C. under a pressure of 2000 atms for one hour. Thereafter, the sintered products were heat-treated in a nitrogen stream at 1400° C. for 24 hours, so that the intergranular phase was crystallized to a sufficient degree.

The obtained sintered products were cut into a shape specified under JIS R1601, machined and polished to obtain samples. The samples were measured for their specific gravities relying on the Archimedes' method to find a ratio relative to the calculated density, and were further put to the four-point-bending fractural strength testing in compliance with JIS R1601 at room temperature and at 1500° C. The samples were further exposed to the air heated at 900° C. or 1500° C. for 100 hours to find a change in the weight per a unit surface area from an increase in the weight and the surface area of the samples. Moreover, crystal phases in the intergranular phase in the sintered products were identified by the X-ray diffraction measurement. The results were as shown in Table 2.

Moreover, the samples were pulverized, and the amount of oxygen was measured by the infrared-ray absorbing method by being finally converted into carbon dioxide, the amount of nitrogen was measured relying upon the conduction of heat, and silicon and elements of the Group 3a of periodic table inclusive of Lu were measured by the ICP light-emitting spectral analysis. However, no change was recognized in the compositions of the sintered products.

TABLE 1

| Sample No. | Composition (mol %) (remainder is $Si_3N_4$) | | Excess of oxygen ($SiO_2$) | $SiO_2/RE_2O_3$ | Firing method |
| --- | --- | --- | --- | --- | --- |
| | $Lu_2O_3$ | $RE_2O_3$ | | | |
| *1-1  | —    | $Y_2O_3$  3.0  | 12  | 4   | GPS |
| *1-2  | —    | $Er_2O_3$ 3.0  | 12  | 4   | GPS |
| *1-3  | —    | $Yb_2O_3$ 3.0  | 12  | 4   | GPS |
| 1-4   | 1.0  | $Er_2O_3$ 2.0  | 12  | 4   | GPS |
| 1-5   | 2.0  | $Er_2O_3$ 1.0  | 12  | 4   | GPS |
| 1-6   | 3.0  | —    —        | 12  | 4   | GPS |
| 1-7   | 1.0  | $Yb_2O_3$ 2.0  | 12  | 4   | GPS |
| 1-8   | 2.0  | $Yb_2O_3$ 1.0  | 12  | 4   | GPS |
| 1-9   | 3.0  | —    —        | 12  | 4   | GPS |
| *1-10 | 3.0  | —    —        | 4.5 | 1.5 | GPS |
| 1-11  | 3.0  | —    —        | 6   | 2   | GPS |
| 1-12  | 2.0  | —    —        | 18  | 9   | GPS |
| 1-13  | 6.0  | —    —        | 24  | 4   | GPS |
| *1-14 | 11.0 | —    —        | 33  | 3   | GPS |
| *1-15 | —    | $Yb_2O_3$ 3.0  | 12  | 4   | HIP |
| 1-15  | 1.0  | $Yb_2O_3$ 2.0  | 12  | 4   | HIP |
| 1-17  | 2.0  | $Yb_2O_3$ 1.0  | 12  | 4   | HIP |
| 1-18  | 3.0  | —    —        | 12  | 4   | HIP |
| 1-19  | 3.0  | —    —        | 6   | 2   | HIP |
| 1-20  | 2.0  | —    —        | 18  | 9   | HIP |
| 1-21  | 0.5  | —    —        | 2   | 4   | HIP |
| 1-22  | 0.5  | —    —        | 5   | 10  | HIP |

Note 1): Samples marked with * are Reference Examples
Sample No. 1–9 used $RE_2Si_2O_7$ powder.

TABLE 2

| Sample No. | Ratio to calculated density (%) | Fractural strength (MPa) | | Increase of oxide (mg/cm$^2$) | | Intergranular crystal phase (Note 2) |
| --- | --- | --- | --- | --- | --- | --- |
| | | Room temp. | 1500° C. | 900° C. | 1500° C. | |
| 1-*1  | 99  | 880  | 330 | 0.00 | 0.26 | Y2S + SNO |
| 1-*2  | 99  | 870  | 350 | 0.00 | 0.22 | Er2S + SNO |
| 1-*3  | 99  | 880  | 380 | 0.00 | 0.24 | Yb2S + SNO |
| 1-4   | 99  | 890  | 520 | 0.00 | 0.18 | (Er,Lu)2S + SNO |
| 1-5   | 98  | 880  | 550 | 0.00 | 0.16 | (Er,Lu)2S + SNO |
| 1-6   | 98  | 900  | 620 | 0.00 | 0.12 | Lu2S + SNO |
| 1-7   | 99  | 910  | 550 | 0.00 | 0.19 | (Yb,Lu)2S + SNO |
| 1-8   | 98  | 880  | 580 | 0.00 | 0.17 | (Yb,Lu)2S + SNO |
| 1-9   | 98  | 870  | 610 | 0.00 | 0.11 | Lu2S + SNO |
| 1-*10 | 98  | 890  | 580 | 0.31 | 0.52 | apatite |
| 1-11  | 98  | 910  | 580 | 0.01 | 0.14 | Lu2S |
| 1-12  | 97  | 820  | 600 | 0.00 | 0.10 | Lu2S + SNO |
| 1-13  | 99  | 830  | 590 | 0.00 | 0.15 | Lu2S + SNO |
| 1-*14 | 100 | 750  | 340 | 0.00 | 0.21 | Lu2S + SNO |
| 1-*15 | 100 | 1110 | 390 | 0.00 | 0.24 | Yb2S + SNO |
| 1-16  | 100 | 1060 | 570 | 0.00 | 0.16 | (Yb,Lu)2S + SNO |
| 1-17  | 100 | 1110 | 620 | 0.00 | 0.15 | (Yb,Lu)2S + SNO |
| 1-18  | 100 | 1080 | 650 | 0.00 | 0.10 | Lu2S + SNO |
| 1-19  | 100 | 1140 | 630 | 0.00 | 0.12 | Lu2S + SNO |
| 1-20  | 100 | 1030 | 640 | 0.00 | 0.09 | Lu2S + SNO |

TABLE 2-continued

| Sample No. | Ratio to calculated density (%) | Fractural strength (MPa) Room temp. | 1500° C. | Increase of oxide (mg/cm$^2$) 900° C. | 1500° C. | Intergranular crystal phase (Note 2) |
|---|---|---|---|---|---|---|
| 1-21 | 100 | 1050 | 620 | 0.00 | 0.07 | Lu2S + SNO |
| 1-22 | 100 | 1060 | 620 | 0.00 | 0.06 | Lu2S + SNO |

Note 1):
Samples marked with * are Reference Examples.
Note 2):
(RE)2S: (RE)$_2$Si$_2$O$_7$ (elements of Group 3a of periodic table), SNO;Si$_2$N$_2$O$_7$ According to the results of Tables 1 and 2, the samples Nos. 1—1 to 1–3 and 1–15 which did not contain Lu$_2$O$_3$ but to which was added an oxide of any element of the Group 3a of periodic table exhibited small strength at high temperatures. The sample No. 1–10 having an SiO$_2$/RB$_2$O$_3$ of 1.5 exhibited apatite crystals on the grain boundaries and greatly deteriorated resistance against oxidation. The sample No. 1–14 that contained an oxide of the element of the Group 3a of periodic table and SiO$_2$ in a total amount of not smaller than 30 mol % exhibited inferior resistance against oxidation.

In contract with these Reference Examples, the samples of the present invention all precipitated chiefly disilicate (RE$_2$Si$_2$O$_7$) crystals on the grain boundaries and all exhibited excellent fractural strength and resistance against oxidation.

(Example 2)

Compositions were prepared as shown in Table 3 by using a silicon powder having an average particle diameter of 3 μm and an amount of oxygen of 1.1% by weight as a starting powder, an Lu$_2$O$_3$ powder as a silicon nitride powder (BET specific surface area: 8 m$^2$/g, α-rate; 98%, amount of oxygen: 1.2% by weight, amount of metal impurities: 0.03% by weight), and a powder of an oxide of an element of the Group 3a of periodic table except Lu$_2$O$_3$, or by using an RE$_2$Si$_2$O$_7$ powder synthesized from the LU$_2$O$_3$ powder, a powder of an oxide of an element of the Group 3a of periodic table and a powder of a silicon oxide (sample No. 2–9). By adding a binder, the compositions were molded into blades by the cast molding method. The obtained molded articles were nitrogenated in nitrogen at 1200° C. for 5 hours and then at 1400° C. for 10 hours. From an increase in the weight, it was confirmed that silicon that was added was all nitrogenated in all of the samples.

Thereafter, the obtained nitrogenated products were put into a pot of silicon carbide and were fired in a nitrogen gas stream of a pressure of 10 atms at 1850° C. for 4 hours in order to minimze changes in the compositions. The sintered products were heat-treated in a nitrogen stream at 1400° C. for 24 hours so that the intergranular phase was crystallized to a sufficient degree.

The obtained sintered products were measured for their sizes to find a rate of shrinkage relative to the sizes of the molded articles. Moreover, the shape of the blade was measured to fined a maximum amount of deformation from the designed value. The sintered products were then cut into a shape specified under JIS R1601, and were machined and polished to prepare samples. The samples were measured for their specific gravities based upon Archimedes' method and were put to the four-point-bending fractural strength testing under -IS R1601 at room temperature and at 1500° C.

The samples were further exposed to the air heated at 900° C. or 1500° C. for 100 hours to find a change in the weight per a unit surface area from an increase in the weight and the surface area of the samples. Moreover, crystal phases in the intergranular phase in the sintered products were identified by the X-ray diffraction measurement. The results were as shown in Table 2.

Moreover, the samples were pulverized, and the amount of oxygen was measured by the infrared-ray absorbing method by being finally converted into carbon dioxide, the amount of nitrogen was measured relying upon the conduction of heat, and silicon and elements of the Group 3a of periodic table inclusive of Lu were measured by the ICP light-emitting spectral analysis, in order to find the compositions of the sintered products.

TABLE 3

| Sample No. | Composition (mol %) Note 1) | | | | | SiO$_2$/ RE$_2$O$_3$ |
|---|---|---|---|---|---|---|
| | Si | Si$_3$N$_4$ | Lu$_2$O$_3$ | RE$_2$O$_3$ | SiO$_2$ | |
| *2-1 | — | 85 | 3.0 | — | 12 | 4 |
| 2-2 | 20 | 65 | 3.0 | — | 12 | 4 |
| 2-3 | 40 | 45 | 3.0 | — | 12 | 4 |
| 2-4 | 60 | 25 | 3.0 | — | 12 | 4 |
| 2-5 | 85 | — | 3.0 | — | 12 | 4 |
| 2-*6 | 40 | 45 | — | Y$_2$O$_3$ 3.0 | 12 | 4 |
| 2-*7 | 40 | 45 | — | Er$_2$O$_3$ 3.0 | 12 | 4 |
| 2-*8 | 40 | 45 | — | Yb$_2$O$_3$ 3.0 | 12 | 4 |
| 2-9 | 40 | 45 | 1.0 | Yb$_2$O$_3$ 2.0 | 12 | 4 |
| 2-10 | 40 | 45 | 2.0 | Yb$_2$O$_3$ 1.0 | 12 | 4 |
| 2-11 | 40 | 45 | 2.0 | Er$_2$O$_3$ 1.0 | 12 | 4 |
| 2-12 | 40 | 45 | 2.0 | Y$_2$O$_3$ 1.0 | 12 | 4 |
| 2-13 | 40 | 45 | 3.0 | — | 12 | 4 |
| 2-*14 | 43.5 | 49 | 3.0 | — | 4.5 | 1.5 |
| 2-15 | 43 | 46 | 3.0 | — | 6 | 2 |
| 2-16 | 37.5 | 42.5 | 2.0 | — | 18 | 9 |
| 2-17 | 33 | 37 | 6.0 | — | 24 | 4 |
| *2-18 | 30 | 34 | 9.0 | — | 27 | 3 |
| *2-19 | 26.5 | 29.5 | 11.0 | — | 33 | 3 |

Samples marked with * lie outside the scope of the invention.
Note 1):
Amount of Si is as reckoned as Si$_3$N$_4$.

TABLE 4

| Sample No. | Ratio to calculated density (%) | Shrinking factor (%) | Max. deformation amount | Fractural strength (MPa) Room Temp. | Fractural strength (MPa) 1500° C. | Increase of oxide (mg/cm$^2$) 900° C. | Increase of oxide (mg/cm$^2$) 1500° C. | Intergranular crystal phase note 2) |
|---|---|---|---|---|---|---|---|---|
| 2-1 | 99 | 21 | 170 | 920 | 620 | 0.00 | 0.12 | Lu2S + SNO |
| 2-2 | 99 | 15 | 90 | 910 | 630 | 0.00 | 0.13 | Ln2S + SNO |
| 2-3 | 99 | 12 | 55 | 890 | 610 | 0.00 | 0.15 | Lu2S + SNO |
| 2-4 | 99 | 10 | 40 | 850 | 590 | 0.00 | 0.16 | Lu2S + SNO |
| 2-5 | 98 | 9 | 45 | 820 | 570 | 0.00 | 0.16 | Lu2S + SNO |
| 2-*6 | 99 | 11 | 60 | 870 | 330 | 0.00 | 0.27 | Y2S + SNO |
| 2-*7 | 99 | 12 | 65 | 850 | 350 | 0.00 | 0.21 | Er2S + SNO |
| 2-*8 | 99 | 11 | 65 | 870 | 380 | 0.00 | 0.23 | Yb2S + SNO |
| 2-9 | 99 | 12 | 60 | 860 | 550 | 0.00 | 0.17 | (Yb, Lu) 2S + SNO |
| 2-10 | 99 | 12 | 55 | 880 | 580 | 0.00 | 0.18 | (Yb, Lu) 2S + SNO |
| 2-11 | 99 | 12 | 55 | 870 | 560 | 0.00 | 0.17 | (Er, Lu) 2S + SNO |
| 2-12 | 99 | 12 | 55 | 870 | 540 | 0.00 | 0.19 | (Y, Lu) 2S + SNO |
| 2-13 | 99 | 11 | 50 | 880 | 620 | 0.00 | 0.15 | Lu2S + SNO |
| 2-*14 | 99 | 11 | 45 | 850 | 580 | 0.33 | 0.57 | apatite |
| 2-15 | 99 | 12 | 55 | 860 | 590 | 0.02 | 0.16 | Lu2S |
| 2-16 | 99 | 10 | 50 | 820 | 600 | 0.00 | 0.11 | Lu2S + SNO |
| 2-17 | 99 | 12 | 55 | 810 | 590 | 0.00 | 0.16 | Lu2S + SNO |
| 2-*18 | 100 | 13 | 55 | 800 | 520 | 0.00 | 0.20 | Lu2S + SNO |
| 2-*19 | 100 | 14 | 60 | 740 | 340 | 0.00 | 0.22 | Lu2S + SNO |

Samples marked with * lie outside the scope of the invention.
note 2): In the crystal phase, (RE) 2S is RE$_2$Si$_2$O$_7$ (RE: element of Group 3a), and SNO is Si$_2$N$_2$O.

According to Tables 3 and 4, the samples Nos. 2–6 to 2–8 which did not contain Lu$_2$O$_3$ but to which was added an oxide of any element of the Group 3a of periodic table exhibited small strength at high temperatures. The sample No. 2–14 having an SiO$_2$/RE$_2$O$_3$ of 1.5 exhibited apatite crystals on the grain boundaries and greatly deteriorated resistance against oxidation.

The samples Nos. 2–18 and 2–19 that contained an oxide of the element of the Group 3a of periodic table and SiO$_2$ in a total amount of not smaller than 30 mol % exhibited inferior resistance against oxidation. Furthermore, the sample No. 2–1 to which no silicon powder was added exhibited a shrinking factor of as large as 21% and the amount of deformation exceeded 100 μm.

In contract with these Reference Examples, the samples of the present invention all precipitated chiefly RE$_2$Si$_2$O$_7$ crystals or RE$_2$Si$_2$O$_7$ and Si$_2$N$_2$O$_7$ crystals on the grain boundaries and all exhibited excellent fractural strength and resistance against oxidation. Besides, the shrinking factors were not larger than 15% and the amounts of deformation were not larger than 100 μm featuring very excellent dimensional precision.

(Example 3)

A powder of silicon nitride (BET surface area: 9 m$^2$/g, a-ratio: not smaller than 98%, amount of oxygen: 1.1% by weight, amount of cationic impurities such as Al, Mg, Ca, Fe, etc.: not larger than 30 ppm), an Lu$_2$O$_3$ powder having a purity of not smaller than 99% or having a purity of 96%, a powder of an oxide of an element of the Group 3a of periodic table having a purity of not smaller than 99%, and a powder of silicon oxide having a purity of not smaller than 99.9% were used as starting powders, in order to mix Si$_3$N$_4$, RE$_2$O$_3$ and SiO$_2$ together in suitable amounts. By using methanol as a solvent and by using silicon nitride balls, the powders were mixed and pulverized in a rotary mill for 120 hours. The slurry thereof was dried and was then molded into an article having a diameter of 60 mm and a thickness of 20 mm using a rubber press under a pressure of 3 tons/cm$^2$.

The molded article was then fired according to various firing methods shown in Table 5, wherein GPS stands for a method by which the molded article wan fired at 1600° to 1950° C. under a nitrogen partial pressure of 1 to 10 atms for 20 hours. In the hot press, the molded article was fired at 1700° to 1900° C. under a pressure of 36.3 MPa for one hour. In the RIP, the molded article was buried in the Vycor glass and was fired at a temperature of 1750° C. at which the Vycor glass just melts in an Ar gas atmosphere under a pressure of 2000 atms for one hour. In the GPS+HIP method, the molded article fired under the above-mentioned GPS conditions were further subjected to the hot hydrostatic pressure firing at 1700° C. under a nitrogen gas pressure of 1000 atms for one hour. In the normal-pressure firing, the molded article was fired at 1600° to 1850° C. under a nitrogen gas pressure of 1 atm for 50 hours. To suppress the decomposition during the firing, the amount introduced into the furnace during the firing was selected to be 300 g/liter constant.

In Table 5, the samples Nos. 3–25 and 3–26 were the ones in which part of the silicon nitride powder (51 mol % reckoned as silicon nitride for the sample No. 3–25 and 70 mol % reckoned as silicon nitride for the sample No. 3–26) was substituted by a silicon powder, and were then nitragenated in a pattern of a temperature of 1200° C. under a nitrogen gas pressure of 10 atms for 2 hours, a temperature of 1300° C. under a nitrogen gas pressure of 6 atm for 2 hours and a temperature of 1400° C. under a nitrogen gas pressure of 1 atm for 2 hours, and were then fired under the GPS conditions.

The obtained sintered products were calculated for their ratios relative to calculated densities from the specific gravities found by the Archimedes' method, and were further cut into test pieces measuring 3×4×40 mm, polished, and were subjected to a four-point-bend fractural strength testing at room temperature and at 1500° C. in compliance with JIS R1601. Table 6 shows test results of average of 10 test piacss, as well as resistance against oxidation as an increase in the weight after the sintered product was held in an atmosphere heated at 1500° C. for 100 hours. The crystals in the intergranular phase of the sintered product were identified based on the X-ray diffraction measurement to determine a main phase and a sub-phase. In Table 5, the amount of impurity oxygen was found by pulverizing the sintered product to find the amount of oxygen by chemical analysis, and by converting the amount of oxygen from which is subtracted oxygen in the oxide of an element of the Group 3a of periodic table, into $SiO_2$. Furthermore, the test piece for fractural strength testing was supported in the same manner as the four-point-bend fractural strength testing of JIS R1601, the load of 400 MPa was applied thereto, and was held at 1500° C. for a maximum of 100 hours to measure the time before it was broken.

FIG. 1 is a chart in the X-ray diffraction measurement of the sample No. 3–6 as a representative sintered product of silicon nitride of the present invention.

TABLE 5

| Sample No. Note 1) | Composition (mol %) (remainder is $Si_3N_4$) | | | | Firing method |
|---|---|---|---|---|---|
| | $Lu_2O_3$ | $RE_2O_3$ other than $Lu_2O_3$ | Impurity oxygen (reckoned as $SiO_2$) | $SiO_2/RE_2O_3$ | |
| 3-*1 | — | $Y_2O_3$ 3.0 | 6 | 2 | GPS |
| 3-*2 | — | $Er_2O_3$ 3.0 | 6 | 2 | GPS |
| 3-*3 | — | $Yb_2O_3$ 3.0 | 6 | 2 | GPS |
| 3-*4 | 0.5 | — | 1 | 2 | GPS |
| 3-5 | 1.0 | — | 2 | 2 | GPS |
| 3-6 | 3.0 | — | 6 | 2 | GPS |
| 3-7 | 7.0 | — | 14 | 2 | GPS |
| 3-8 | 10.0 | — | 20 | 2 | GPS |
| 3-*9 | 15.0 | — | 30 | 2 | GPS |

TABLE 5-continued

| Sample No. Note 1) | Composition (mol %) (remainder is $Si_3N_4$) | | | | Firing method |
|---|---|---|---|---|---|
| | $Lu_2O_3$ | $RE_2O_3$ other than $Lu_2O_3$ | Impurity oxygen (reckoned as $SiO_2$) | $SiO_2/RE_2O_3$ | |
| 3-*10 | 2.9 | $Yb_2O_3,Er_2O_3$ 0.1 | 3.9 | 1.3 | GPS |
| 3-11 | 2.9 | $Yb_2O_3,Er_2O_3$ 0.1 | 4.8 | 1.6 | GPS |
| 3-12 | 2.9 | $Yb_2O_3,Er_2O_3$ 0.1 | 6.0 | 1.9 | GPS |
| 3-13 | 2.9 | $Yb_2O_3,Er_2O_3$ 0.1 | 8.1 | 2.7 | GPS |
| 3-14 | 2.9 | $Yb_2O_3,Er_2O_3$ 0.1 | 10.5 | 3.5 | GPS |
| 3-*15 | 2.9 | $Yb_2O_3,Er_2O_3$ 0.1 | 15.0 | 5.0 | GPS |
| 3-16 | 1.0 | $Y_2O_3$ 2.0 | 6 | 2 | GPS |
| 3-17 | 1.0 | $Yb_2O_3$ 2.0 | 6 | 2 | GPS |
| 3-18 | 2.0 | $Yb_2O_3$ 1.0 | 6 | 2 | GPS |
| 3-19 | 1.0 | $Er_2O_3$ 2.0 | 6 | 2 | GPS |
| 3-20 | 2.0 | $Er_2O_3$ 1.0 | 6 | 2 | GPS |
| 3-21 | 2.9 | $Yb_2O_3,Er_2O_3$ 0.1 | 6 | 2 | hot press |
| 3-22 | 2.9 | $Yb_2O_3,Er_2O_3$ 0.1 | 6 | 2 | HIP |
| 3-23 | 2.9 | $Yb_2O_3,Er_2O_3$ 0.1 | 6 | 2 | normal pressure |
| 3-24 | 2.9 | $Yb_2O_3,Er_2O_3$ 0.1 | 6 | 2 | GPS + HIP |
| 3-25 | 2.9 | $Yb_2O_3,Er_3O_3$ 0.1 | 6 | 2 | RG |
| 3-26 | 2.9 | $Yb_2O_3,Er_2O_3$ 0.1 | 6 | 2 | RG |

Note 1): samples marked with * are Reference Examples.

TABLE 6

| Sample No. | Ratio to calculated density (%) | Fractural strength (MPa) | | Increase of weight due to oxidation (mg/cm²) | Resistance against creeping (hr) | Breaking toughness $K_1C$ MPa.m$^{1/2}$ | Crystal phase Note 2) | |
|---|---|---|---|---|---|---|---|---|
| | | Room temp. | 1500° C. | | | | Main phase | Sub-phase |
| 3-*1 | 100 | 880 | 360 | 0.29 | readily broken | 5.9 | R2S | RS |
| 3-*2 | 100 | 880 | 380 | 0.26 | readily broken | 6.2 | R2S | RS |
| 3-*3 | 100 | 900 | 390 | 0.22 | readily broken | 6.2 | R2S | RS |
| 3-*4 | 95 | 660 | 420 | 0.14 | 1 | 6.0 | R2S | RS |
| 3-5 | 99 | 880 | 620 | 0.07 | >100 | 6.2 | R2S | RS |
| 3-6 | 100 | 920 | 610 | 0.10 | >100 | 6.3 | R2S | RS |
| 3-7 | 100 | 900 | 580 | 0.13 | >100 | 6.4 | R2S | RS |
| 3-8 | 100 | 870 | 570 | 0.16 | 85 | 6.4 | R2S | RS |
| 3-*9 | 100 | 720 | 440 | 0.23 | 3 | 6.5 | R2S | RS |
| 3-*10 | 100 | 900 | 600 | 0.60 | >100 | 6.2 | A | — |
| 3-11 | 100 | 920 | 600 | 0.20 | >100 | 6.3 | RS | R2S, A |
| 3-12 | 100 | 910 | 590 | 0.12 | >100 | 6.3 | R2S | RS |
| 3-13 | 100 | 890 | 580 | 0.11 | >100 | 6.1 | R2S | — |
| 3-14 | 100 | 870 | 570 | 0.11 | 96 | 5.8 | R2S | — |
| 3-*15 | 100 | 860 | 540 | 0.10 | 90 | 4.5 | R2S | SNO |
| 3-16 | 100 | 810 | 530 | 0.22 | 85 | 6.0 | R2S | RS |
| 3-17 | 100 | 910 | 540 | 0.18 | 86 | 6.2 | R2S | RS |
| 3-18 | 100 | 920 | 570 | 0.14 | >100 | 6.2 | R2S | RS |
| 3-19 | 100 | 930 | 530 | 0.20 | 89 | 6.3 | R2S | RS |
| 3-20 | 100 | 920 | 570 | 0.16 | >100 | 6.2 | R2S | RS |
| 3-21 | 100 | 1070 | 650 | 0.15 | >100 | 6.5 | R2S | RS |
| 3-22 | 100 | 1150 | 660 | 0.11 | >100 | 6.0 | R2S | RS |
| 3-23 | 98 | 860 | 560 | 0.12 | 80 | 6.5 | R2S | RS |
| 3-24 | 100 | 1040 | 630 | 0.11 | >100 | 6.2 | R2S | RS |
| 3-25 | 100 | 880 | 580 | 0.11 | >100 | 6.1 | R2S | RS |
| 3-26 | 100 | 850 | 570 | 0.12 | >100 | 6.2 | R2S | RS |

Note 1): Samples marked with * are Reference Examples.
Note 2): RS is monosilicate phase, R2S is disilicate phase, SNO is silicon oxynitride phase, and A is apatite phase.

As will be obvious from the results of Table 5 and 6, when the samples Nos. 3–1, 3–2 and 3—3 using Y. Yb and Er as elements of the Group 3a of periodic table are compared with the samples Nos. 3–6, 3–16 to 3–20 using Lu as an element of the Group 3a of periodic table, the samples using Lu exhibit large strengths at high temperatures and very excellent resistance against creeping. Referring to the samples Nos. 3–4 to 3–9 in which the amount of the oxide of the element of the Group 3$a$ of periodic table was changed, the sample No. 3–4 in which the sum amount of the oxide thereof and $SiO_2$ was less than 2 mol % possessed slightly insufficient density, and the sample No. 3–9 in which the amount of the oxide thereof and $SiO_2$ exceed 10 mol % exhibited decreased strength and decreased resistance against creeping at high temperatures.

In the samples Nos. 3–10 to 3–15 in which the $SiO_2/RE_2O_3$ ratio was changed, the RE—Si—O crystals precipitated on the grain boundaries when the $SiO_2/RE_2O_3$ ratio was not smaller than 1.6. In the sample No. 3–15 in which the $SiO_2/RE_2O_3$ ratio exceed 3.5, the breaking toughness slightly decreased, decomposition phase developed on the surfaces, and difference was observed in the color tone on the inner side and on the outer side the sintered product.

The samples Nos. 3–21 to 3–24 obtained by other firing methods and the samples Nos. 3–25 to 3–26 in which part of the silicon nitride was substituted by silicone, all exhibited satisfactory properties.

(Example 4)

A powder of silicon nitride (BET surface area: 7 to 10 $m^2/g$, α-rate: 80 to 98%, amount of oxygen: 1.0 to 1.2% by weight, amount of cationic impurities: not larger than 0.05% by weight, imide decomposition method), a powder of oxide of an element of the Group 3a of periodic table, and a powder of silicon oxide were used as starting powders, and were mixed together to form compositions shown in Tables 7 and 8, and were then molded into an article having a diameter of 60 mm and a thickness of 40 mm using a rubber press under the pressure of 3 tons/$cm^2$. The obtained molded article was placed in a GPS firing furnace, fired under first firing conditions shown in table 7, and was then fired under second firing conditions of a temperature of from 1900° to 2050° C. under an $N_2$ pressure of 10 atms for 10 hours. An $Si/SiO_2$ powder was placed in the firing furnace to suppress the change in the composition. As for the crystal phase after the first firing in the above-mentioned step of firing, a fired product after the first firing was separately taken out and was measured for its amount of β-silicon nitride and was identified for its intergranular crystal phase relying upon the X-ray diffraction measurement.

In these Tables, the samples Nos. 4–24 to 4–26 were those obtained by adding a silicon powder having a purity of not smaller than 95% to the starting materials, the sample No. 4–24 was the one obtained by adding silicon in an amount of 30 mol % reckoned as a silicon nitride and a powder of silicon nitride in an amount of 59.5 mol %, the sample No. 4–25 was the one obtained by adding silicon in an amount of 50 mol % reckoned as a silicon nitride and adding a powder of silicon nitride in an amount of 39.5 mol %, and the sample No. 4–26 was the one obtained by adding silicon in an amount of 89.5 mol % reckoned as a silicon nitride. These mixture powders were molded, and the molded articles ware heat-treated in a temperature pattern of 1150° C. under a nitrogen pressure of 10 atms for 2 hours, 1300° C. for 2 hours, and 1400° C. for 2 hours, to transform silicon into a silicon nitride, followed by firing in the same manner as described above.

The obtained sintered products were measured for their specific gravities relying upon the Archimedes' method, calculated for their ratios relative to calculated densities, and were found for their average particle diameter (short-axis diameter) from 20 silicon nitride particles and for their average aspect ratio (long-axis diameter/short-axis diameter) from their electron microphotographs.

The sintered products were further cut into test pieces measuring 3×4×40 mm, polished, and were subjected to a four-point-bend fractural strength testing at room temperature and at 1500° C. in compliance with JIS R1601. Test results in average of 10 test pieces were as shown in Tables 8. The intergranular crystal phase other than the β-silicon nitride was also identified based on the X-ray diffraction measurement. Moreover, the test pieces for fractural strength testing were placed in an atmosphere of 900° C. and 1500° C. for 100 hours, and were measured for their increase in the weight. The results were as shown in Tables 8.

TABLE 7

| Sample No. | $Si_3N_4$ Amount (mol %) | α-ratio (%) | $RE_2O_3$ (A) (mol %) | | $SiO_2$ (B) (mol %) | (B)/(A) | First firing condition Temp. (°C.) | Time (hr) | $N_2$ pressure (atm) | Amount of β-SN phase (mol %) | Crystal note 1) | Second firing temp. (°C.) |
|---|---|---|---|---|---|---|---|---|---|---|---|---|
| 4-1 | 89.5 | 95 | $Lu_2O_3$ | 3.0 | 7.5 | 2.5 | 1650 | 10 | 1 | 85 | Lu2S | 1900 |
| 4-2 | 89.5 | 90 | $Lu_2O_3$ | 3.0 | 7.5 | 2.5 | 1650 | 10 | 1 | 90 | Lu2S | 1900 |
| 4-*3 | 89.5 | 80 | $Lu_2O_3$ | 3.0 | 7.5 | 2.5 | 1650 | 10 | 1 | 100 | Lu2S | 1900 |
| 4-4 | 79.0 | 95 | $Lu_2O_3$ | 6.0 | 15.0 | 2.5 | 1650 | 10 | 1 | 93 | Lu2S | 1900 |
| 4-5 | 91.0 | 95 | $Lu_2O_3$ | 3.0 | 6.0 | 2.0 | 1650 | 10 | 1 | 80 | LuS | 1900 |
| 4-6 | 85.0 | 95 | $Lu_2O_3$ | 3.0 | 12.0 | 4.0 | 1650 | 10 | 1 | 95 | Lu2S | 1900 |
| 4-*7 | 92.5 | 95 | $Lu_2O_3$ | 3.0 | 4.5 | 1.5 | 1650 | 10 | 1 | 72 | Y | 1900 |
| 4-8 | 89.5 | 95 | $Lu_2O_3$ | 3.0 | 7.5 | 2.5 | 1600 | 20 | 1 | 76 | Lu2S | 1900 |
| 4-*9 | 89.5 | 95 | $Lu_2O_3$ | 3.0 | 7.5 | 2.5 | 1750 | 10 | 1 | 100 | Lu2S | 1900 |
| 4-*10 | 89.5 | 95 | $Lu_2O_3$ | 3.0 | 7.5 | 2.5 | 1600 | 1 | 1 | 60 | Lu2S | 1900 |
| 4-*11 | 89.5 | 95 | $Lu_2O_3$ | 3.0 | 7.5 | 2.5 | 1700 | 30 | 1 | 100 | Y | 1900 |
| 4-12 | 89.5 | 95 | $Lu_2O_3$ | 3.0 | 7.5 | 2.5 | 1650 | 10 | 1 | 85 | Lu2S | 2000 |
| 4-*13 | 89.5 | 95 | $Lu_2O_3$ | 3.0 | 7.5 | 2.5 | 1650 | 10 | 1 | 85 | Lu2S | 2050 |
| 4-*14 | 89.5 | 95 | $Y_2O_3$ | 3.0 | 7.5 | 2.5 | 1650 | 10 | 1 | 95 | Y2S | 1900 |
| 4-*15 | 89.5 | 95 | $Yb_2O_3$ | 3.0 | 7.5 | 2.5 | 1650 | 10 | 1 | 95 | Yb2S | 1900 |
| 4-*16 | 89.5 | 95 | $Er_2O_3$ | 3.0 | 7.5 | 2.5 | 1650 | 10 | 1 | 95 | Er2S | 1900 |
| 4-*17 | 89.5 | 95 | $Dy_2O_3$ | 3.0 | 7.5 | 2.5 | 1650 | 10 | 1 | 95 | Dy2S | 1900 |
| 4-*18 | 89.5 | 95 | $Ho_2O_3$ | 3.0 | 7.5 | 2.5 | 1650 | 10 | 1 | 95 | Ho2S | 1900 |

TABLE 7-continued

| | Si₃N₄ | | RE₂O₃ | SiO₂ | | First firing condition | | | Amount | Crystal | Second firing |
| Sample No. | Amount (mol %) | α-ratio (%) | (A) (mol %) | (B) (mol %) | (B)/ (A) | Temp. (°C.) | Time (hr) | N₂ pressure (atm) | of β-SN phase (mol %) | note 1) | temp. (°C.) |
| --- | --- | --- | --- | --- | --- | --- | --- | --- | --- | --- | --- |
| 4-*19 | 89.5 | 95 | Tb₂O₃ | 3.0 | 7.5 | 2.5 | 1650 | 10 | 1 | 95 | Tb2S | 1900 |
| 4-*20 | 89.5 | 95 | Tm₂O₃ | 3.0 | 7.5 | 2.5 | 1650 | 10 | 1 | 95 | Tm2S | 1900 |
| 4-*21 | 89.5 | 95 | Sc₂O₃ | 3.0 | 7.5 | 2.5 | 1650 | 10 | 1 | 95 | Sc2S | 1900 |
| 4-*22 | 98.25 | 95 | Lu₂O₃ | 0.5 | 1.25 | 2.5 | 1650 | 10 | 1 | 95 | Lu2S | 2000 |
| 4-23 | 88.0 | 95 | Lu₂O₃ | 3.0 | 9.0 | 3.0 | 1650 | 10 | 1 | 95 | Lu2S | 1900 |
| 4-24 | (89.5) | 95 | Lu₂O₃ | 3.0 | 7.5 | 2.5 | 1650 | 10 | 1 | 85 | Lu2S | 1900 |
| 4-25 | (89.5) | 95 | Lu₂O₃ | 3.0 | 7.5 | 2.5 | 1650 | 10 | 1 | 85 | Lu2S | 1900 |
| 4-26 | (89.5) | — | Lu₂O₃ | 3.0 | 7.5 | 2.5 | 1650 | 10 | 1 | 85 | Lu2S | 1900 |

Note 1): (RE) 2S is a disilicate phase, (RE) S is a monosilicate phase, and Y is a YAM phase.
Samples marked with * are Reference Examples.

TABLE 8

| | | Particle size of | Si₃N₄ | Fractural strength (MPa) | | Increase by oxidation (mg/cm²) | | Intergranular |
| Sample No. | Relative density (%) | β-Si₃N₄ (μm) | aspect ratio | Room temp. | 1500° C. | 900° C. | 1500° C. | crystal phase Note 1) |
| --- | --- | --- | --- | --- | --- | --- | --- | --- |
| 4-1 | 100 | 2 | 10 | 900 | 630 | 0.00 | 0.15 | Lu2S |
| 4-2 | 100 | 3 | 12 | 850 | 620 | 0.00 | 0.14 | Lu2S |
| 4-*3 | 100 | 7 | 20 | 700 | 480 | 0.00 | 0.15 | Lu2S |
| 4-4 | 100 | 4 | 13 | 850 | 600 | 0.00 | 0.20 | Lu2S |
| 4-5 | 100 | 1 | 7 | 910 | 650 | 0.00 | 0.19 | LuS |
| 4-6 | 100 | 4 | 13 | 840 | 600 | 0.00 | 0.20 | Lu2S |
| 4-*7 | 100 | 2 | 8 | 890 | 700 | 1.10 | 1.00 | Y |
| 4-8 | 100 | 4 | 12 | 920 | 640 | 0.00 | 0.13 | Lu2S |
| 4-*9 | 93 | 9 | 23 | 650 | 400 | 0.00 | 0.22 | Lu2S |
| 4-*10 | 96 | 7 | 21 | 720 | 440 | 0.00 | 0.20 | Lu2S |
| 4-*11 | 100 | 3 | 11 | 910 | 690 | 0.82 | 0.75 | Y |
| 4-12 | 100 | 5 | 14 | 830 | 600 | 0.00 | 0.21 | Lu2S |
| 4-*13 | 100 | 8 | 23 | 730 | 500 | 0.05 | 0.26 | Lu2S |
| 4-*14 | 100 | 3 | 10 | 830 | 560 | 0.00 | 0.13 | Y2S |
| 4-*15 | 100 | 1 | 7 | 870 | 580 | 0.00 | 0.15 | Yb2S |
| 4-*16 | 100 | 3 | 9 | 840 | 570 | 0.00 | 0.14 | Er2S |
| 4-*17 | 100 | 3 | 11 | 810 | 550 | 0.00 | 0.18 | Dy2S |
| 4-*18 | 100 | 2 | 8 | 820 | 550 | 0.00 | 0.16 | Ho2S |
| 4-*19 | 100 | 3 | 10 | 810 | 530 | 0.00 | 0.17 | Tb2S |
| 4-*20 | 100 | 2 | 10 | 840 | 560 | 0.00 | 0.14 | Tm2S |
| 4-*21 | 100 | 2 | 8 | 820 | 540 | 0.00 | 0.16 | Sc2S |
| 4-*22 | 91 | 8 | 19 | 620 | 350 | 0.00 | 0.19 | Lu2S |
| 4-23 | 100 | 3 | 11 | 880 | 620 | 0.00 | 0.17 | Lu2S |
| 4-24 | 100 | 2 | 8 | 910 | 640 | 0.00 | 0.14 | Lu2S |
| 4-25 | 100 | 2 | 8 | 890 | 620 | 0.00 | 0.15 | Lu2S |
| 4-26 | 96 | 4 | 13 | 810 | 600 | 0.00 | 0.19 | Lu2S |

Note 1): (RE) 2S is a disilicate phase, (RE) S is a monosilicate phase, Y is a YAM phase.
Samples marked with * are Reference Examples.

According to the results of Tables 7 and 8 the sample No. 4–7 having the $SiO_2/RE_2O_3$ ratio of not larger than 1.6 permitted the YAM phase to precipitate, and possessed high fractural strength but was inferior in resistance against oxidation at high temperatures. Among the samples having the $SiO_2/RE_2O_3$ ratio of not smaller than 1.6, the sample No. 4–3 having the α-ratio pf not larger than 90% contained silicon nitride particles of large diameters and could not exhibit increased strength. The sample No. 4–11 possessed a composition that was encompassed in the range of the present invention at first, but underwent a charge in the composition while it was held in the first firing step for a long period of time and, hence, possessed the $SiO_2/RE_2O_3$ ratio of less than 1.6, permitted the YAM phase to be formed as the intergranular crystal phase and exhibited very decreased resistance against oxidation at high temperatures.

The sample No. 4–9 that was heated in the first firing step at a temperature in excess of 1700° C. permitted particles to grow and voids to remain in many number, and possessed small strength. Even the sample No. 4–10 that contained β-silicon nitride in an amount of not larger than 70% after the first firing step contained voids and silicon nitride particles of large sizes. The sample No. 4–13 that was heated at the second firing step at a temperature in excess of 2000° C. permitted particles to grow abnormally and possessed small strength. Moreover, the sample No. 4–22 that contained $RE_2O_3$ and $SiO_2$ in a total amount of not larger than 2 mol % failed to possess density of a sufficient degree.

The samples of the present invention all possessed strength at room temperature of not smaller than 800 MPa, strength at 1500° C. of not smaller than 500 MPa, and permitted the weight to increase by not more than 0.1 mg/cm² due to oxidation at 900° C. and permitted the weight to increase by not more than 0.3 mg/cm² due to oxidation at 1500° C. in particular, the samples (Nos. 4–1, 4–2, 4—4, 4–5, 4–6, 4–8, 4–12, 4–23 to 4–26) that contain Lu as the element of the Group 3a of periodic table possessed strength at 1500° C. of not smaller than 600 MPa.

We claim:

1. A sintered product of silicon nitride, comprising:

not less than 70 mol % of a β-silicon nitride, an impurity oxygen and an element of Group 3a of the periodic table including Lu in an amount not less than 0.5 mol % expressed as an oxide thereof, wherein the Group 3a element (RE) and the impurity oxygen are present in a total amount of from 2 to 30 mol % when the content of the Group 3a element is expressed as an amount of an oxide $RE_2O_3$ of the Group 3a element and the impurity oxygen is expressed as an amount of $SiO_2$ of impurity oxygen, the molar ratio $SiO_2/RE_2O_3$ of the amount of the Group 3a element expressed as the oxide $RE_2O_3$ thereof to the amount of impurity oxygen expressed as $SiO_2$ is from 1.6 to 10, and the sintered product comprises an intergranular phase, the intergranular phase comprising a crystal phase consisting essentially of the Group 3a element, silicon and oxygen.

2. The sintered product of claim 1, wherein the crystal phase comprises at least one phase selected from the group consisting of a disilicate crystal phase and a monosilicate crystal phase.

3. The sintered product of claim 1, wherein the β-silicon nitride is present in an amount of from 70 to 97 mol %, the oxide of the Group 3a element $RE_2O_3$ and $SiO_2$ of impurity oxygen are present in a total amount of from 3 to 30 mol %, the molar ratio $SiO_2/RE_2O_3$ is between 1.6 and 3.8, the β-silicon nitride comprises crystalline particles, the intergranular phase comprises at least one of a disilicate crystal phase and a monosilicate crystal phase.

4. The sintered product of claim 3, wherein the crystalline particles of the β-silicon nitride have a short-axis and a long-axis and have an average short-axis diameter of not larger than 5 μm, and an average aspect ratio of from 5 to 15.

5. The sintered product of silicon nitride of claim 1, wherein the sintered product has a fractural strength at 1500° C. of not less than 500 MPa.

* * * * *